US012695190B2

(12) United States Patent
Lin et al.

(10) Patent No.: US 12,695,190 B2
(45) Date of Patent: Jul. 28, 2026

(54) ANTENNA APPARATUS

(71) Applicant: AUO Corporation, Hsinchu City (TW)

(72) Inventors: Chuang Yueh Lin, Hsinchu City (TW); Yi-Hsiang Lai, Hsinchu City (TW); Ching-Huan Lin, Hsinchu City (TW); Chun-I Wu, Hsinchu City (TW); Yi-Chen Hsieh, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 55 days.

(21) Appl. No.: 18/967,563

(22) Filed: Dec. 3, 2024

(65) Prior Publication Data

US 2025/0309536 A1 Oct. 2, 2025

(30) Foreign Application Priority Data

Mar. 26, 2024 (TW) .................................. 113111215

(51) Int. Cl.

*H01Q 1/38* (2006.01)
*H01Q 1/42* (2006.01)
*H01Q 5/307* (2015.01)

(52) U.S. Cl.

CPC ............. *H01Q 5/307* (2015.01); *H01Q 1/422* (2013.01)

(58) Field of Classification Search

CPC ........... H01Q 5/307; H01Q 1/422; H01Q 1/38
See application file for complete search history.

(56) References Cited

U.S. PATENT DOCUMENTS

2022/0115785 A1* 4/2022 Takayama .............. H01Q 9/045

FOREIGN PATENT DOCUMENTS

| | | |
|---|---|---|
| CN | 104538717 | 9/2017 |
| TW | I827926 | 1/2024 |
| TW | I831404 | 2/2024 |

* cited by examiner

*Primary Examiner* — David E Lotter
(74) *Attorney, Agent, or Firm* — JCIPRNET

(57) ABSTRACT

An antenna apparatus includes a signal source substrate, a feeding substrate, an intermediate substrate, a bridge substrate, a jointing element, and a modulation structure. The feeding substrate is partially disposed on the signal source substrate. The feeding substrate includes a second base. A first portion of the second base is disposed on the signal source substrate. A second portion of the second base is disposed outside an area of the signal source substrate. The intermediate substrate is disposed on the first portion of the feeding substrate. The bridge substrate is disposed on the intermediate substrate. The jointing element joints the bridge substrate, the intermediate substrate, the feeding substrate, and the signal source substrate. The modulation structure is disposed on the second portion of the feeding substrate.

7 Claims, 10 Drawing Sheets

ANTENNA APPARATUS

CROSS-REFERENCE TO RELATED APPLICATION

This application claims the priority benefit of Taiwan application serial no. 113111215, filed on Mar. 26, 2024. The entirety of the above-mentioned patent application is hereby incorporated by reference herein and made a portion of this specification.

BACKGROUND

Technical Field

The disclosure relates to an electronic device, and in particular to an antenna apparatus.

Related Art

In modern life, the application of wireless communication technology is ubiquitous. For example, smartphones typically have systems using the wireless communication technology such as a wireless wide area network (WWAN), a digital television broadcasting system (DTV), a global positioning system (GPS), a wireless local area network (WLAN), a near field communication (NFC), a long term evolution (LTE), and a wireless personal network (WLPN). Moreover, in major cities or public spaces, a wireless local area network environment has become a necessary facility, and many people even establish their own wireless local area networks at home.

With the development of 5G technology, in order to ensure that base station signals cover every corner, antenna apparatuses are typically configured to reorganize signals emitted from base stations and then transmit the signals in different directions. There are many types of antenna apparatuses, one of which may include a signal source substrate, a feeding substrate, and a modulation structure disposed on the feeding substrate which includes a liquid crystal layer. The signal source substrate, the feeding substrate, and the modulation structure need to be connected to each other by using special connectors. However, the price of special connectors is relatively high, which is not conducive to cost reduction. In addition, the special connectors also need to be soldered to the ground electrode of the modulation structure, making assembly difficult.

SUMMARY

The disclosure provides an antenna apparatus with good performance.

An antenna apparatus of the disclosure includes a signal source substrate, a feeding substrate, an intermediate substrate, a bridge substrate, a jointing element, and a modulation structure. The signal source substrate includes a first base, a signal source line, and a first electrode. The first base has an upper surface. The signal source line is disposed on the upper surface of the first base. The first electrode is disposed on the upper surface of the first base and is structurally separated from the signal source line. The feeding substrate is partially disposed on the signal source substrate. The feeding substrate includes a second base, a feeding signal line, a second electrode, and a third electrode. The second base has an upper surface and a lower surface opposite to each other. The lower surface of the second base of the feeding substrate faces the upper surface of the first base of the signal source substrate. The second base has a first portion and a second portion connected to each other. The first portion of the second base is disposed on the signal source substrate. The second portion of the second base is disposed outside an area of the signal source substrate. The feeding signal line is disposed on the lower surface of the second base. A portion of the feeding signal line of the feeding substrate is stacked on a portion of the signal source line of the signal source substrate. The second electrode is disposed on the lower surface of the second base and is structurally separated from the feeding signal line. The second electrode of the feeding substrate is stacked on the first electrode of the signal source substrate. The third electrode is disposed on the upper surface of the second base and is electrically connected to the second electrode. The intermediate substrate is disposed on the first portion of the feeding substrate. The intermediate substrate includes a third base, a fourth electrode, and a fifth electrode. The third base has an upper surface and a lower surface opposite to each other. The lower surface of the third base faces the upper surface of the second base of the feeding substrate. The fourth electrode is disposed on the lower surface of the third base. The fourth electrode of the intermediate substrate is stacked on the third electrode of the feeding substrate. The fifth electrode is disposed on the upper surface of the third base and is electrically connected to the fourth electrode. The bridge substrate is disposed on the intermediate substrate. The bridge substrate includes a fourth base and a sixth electrode. The fourth base has a lower surface. The lower surface of the fourth base faces the upper surface of the third base of the intermediate substrate. The sixth electrode is disposed on the lower surface of the fourth base. The sixth electrode of the bridge substrate is stacked on the fifth electrode of the intermediate substrate. The fourth base of the bridge substrate has an extension portion extending beyond an area of the intermediate substrate. The sixth electrode has an extension portion. The extension portion of the sixth electrode is disposed on the extension portion of the fourth base. The jointing element joins the bridge substrate, the intermediate substrate, the feeding substrate, and the signal source substrate. The modulation structure is disposed on the second portion of the feeding substrate. The modulation structure includes a fifth base, a sixth base, a liquid crystal layer, and a seventh electrode. The fifth base is located between the sixth base and the feeding substrate. The liquid crystal layer is disposed between the fifth base and the sixth base. The seventh electrode is disposed on the fifth base and is located between the liquid crystal layer and the fifth base. The fifth base has an extension portion extending beyond an area of the sixth base. The seventh electrode has an extension portion. The extension portion of the seventh electrode is disposed on the extension portion of the fifth base. The extension portion of the sixth electrode of the bridge substrate is disposed on the extension portion of the seventh electrode of the modulation structure.

DESCRIPTION OF THE EMBODIMENTS

Figure 1:
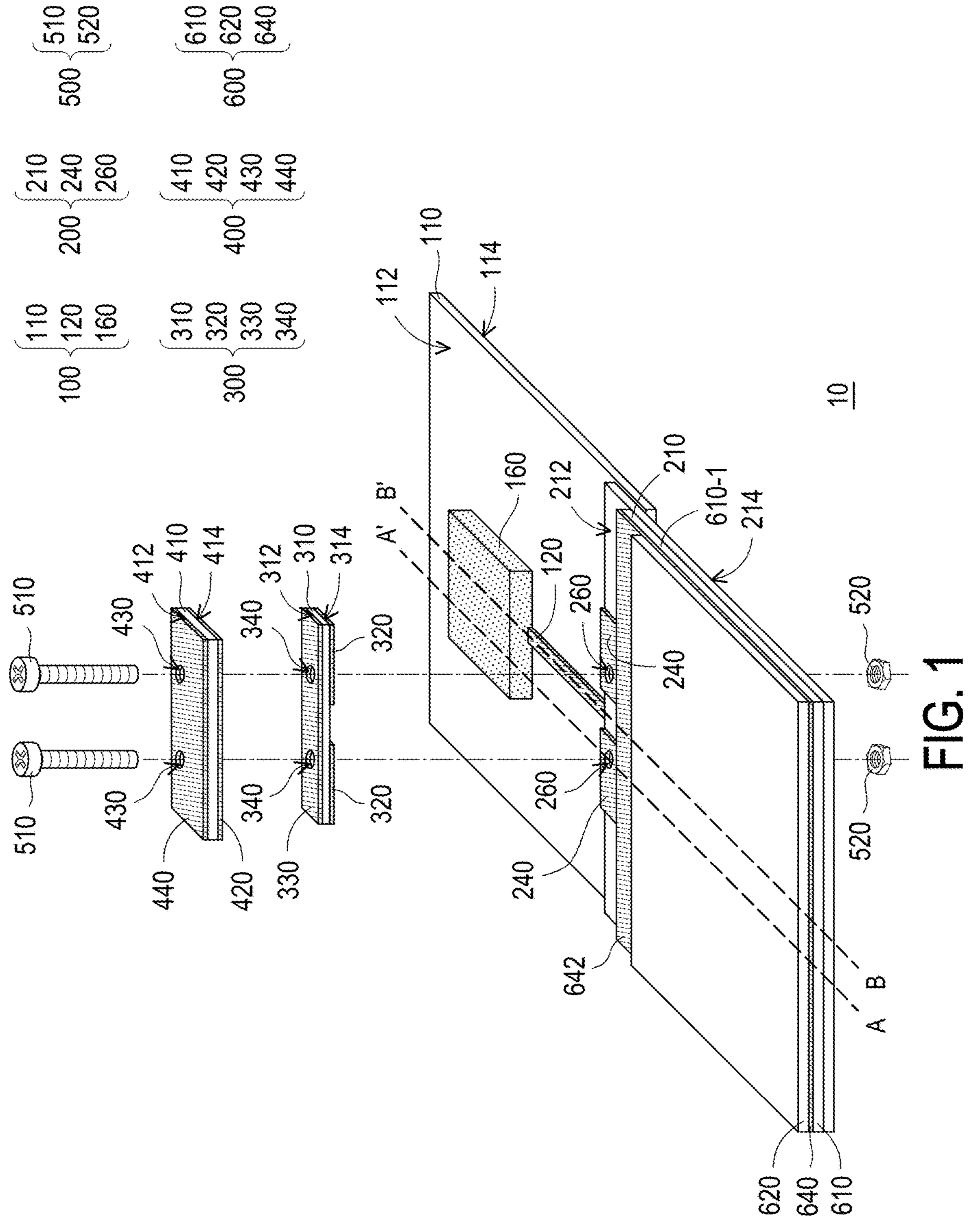
FIG. 1 is an exploded perspective view illustrating an antenna apparatus according to an embodiment of the disclosure.

Reference will now be made in detail to exemplary implementations of the disclosure, examples of which are illustrated in the accompanying drawings. Wherever possible, the same reference numerals are used in the drawings and the description to represent the same or similar parts.

It should be understood that when an element such as a layer, film, region, or substrate is referred to as being "on" or "connected to" another element, it may be directly on or connected to the other element, or intervening elements may also be present. In contrast, when an element is referred to as being "directly on" or "directly connected to" another element, there are no intervening elements present. As used herein, "connection" may refer to physical and/or electrical connection. Furthermore, an "electrical connection" or "coupling" may the another element between two elements.

Considering the particular amount of measurement and measurement-related errors discussed (i.e., the limitations of the measurement system), the terminology "about," "approximately," "essentially," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±15%, ±10%, or ±5%. Furthermore, the terminology "about," "approximately," "essentially," or "substantially" as used herein may be chosen from a range of acceptable deviations or standard deviations depending on the optical properties, etching properties, or other properties, rather than one standard deviation for all properties.

Unless otherwise defined, all terms (including technical terms and scientific terms) used herein have the same meanings commonly understood by those with ordinary knowledge in the art. It is understood that the terms, such as those defined in commonly used dictionaries, should be interpreted as having meaning consistent with the context or background of the relevant technology and this disclosure, and should not be interpreted in an idealized or overly formal manner, unless specifically defined in the embodiment of the disclosure.

Figure 2:
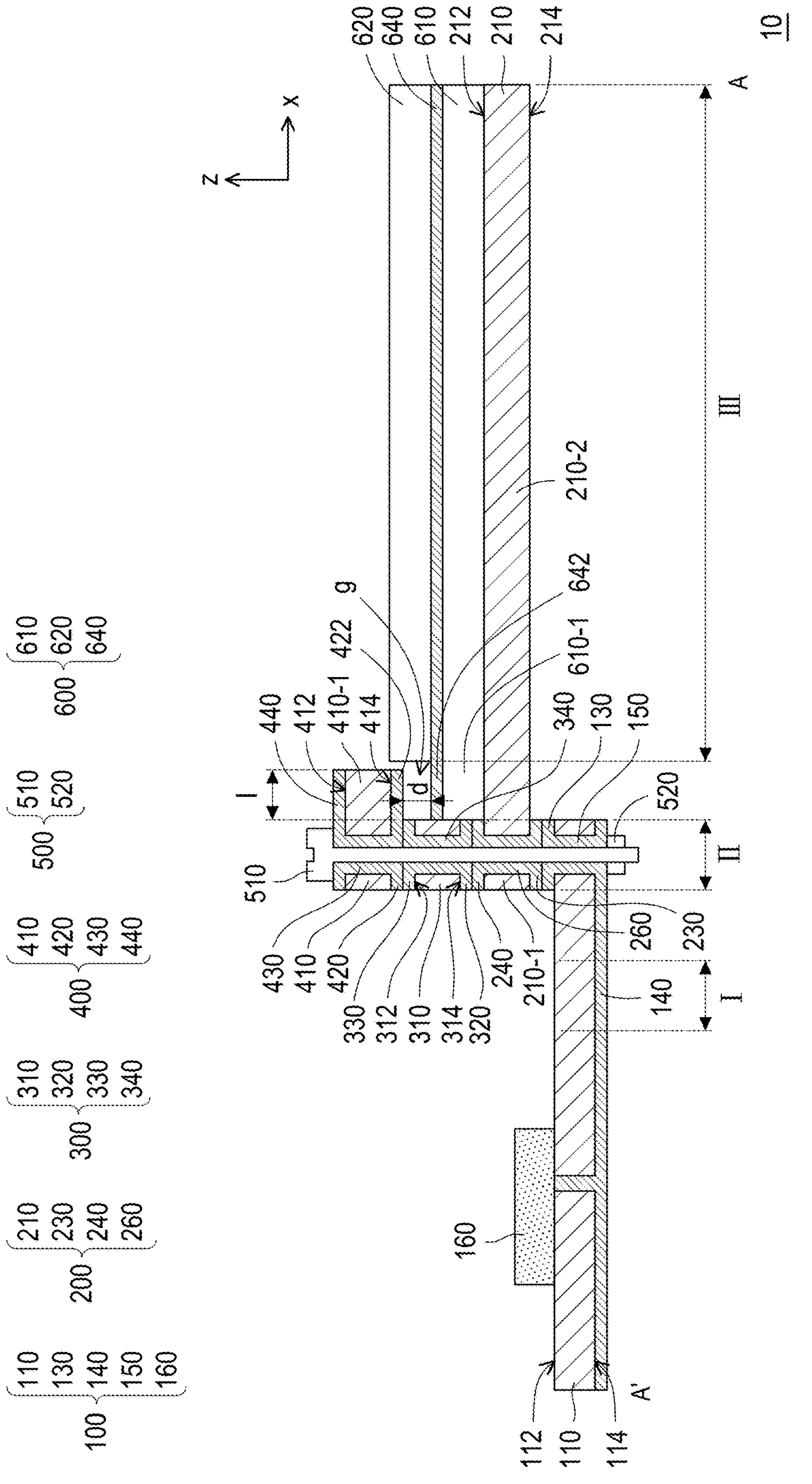
FIG. 2 is a cross-sectional view illustrating an antenna apparatus according to an embodiment of the disclosure.
Figure 3:
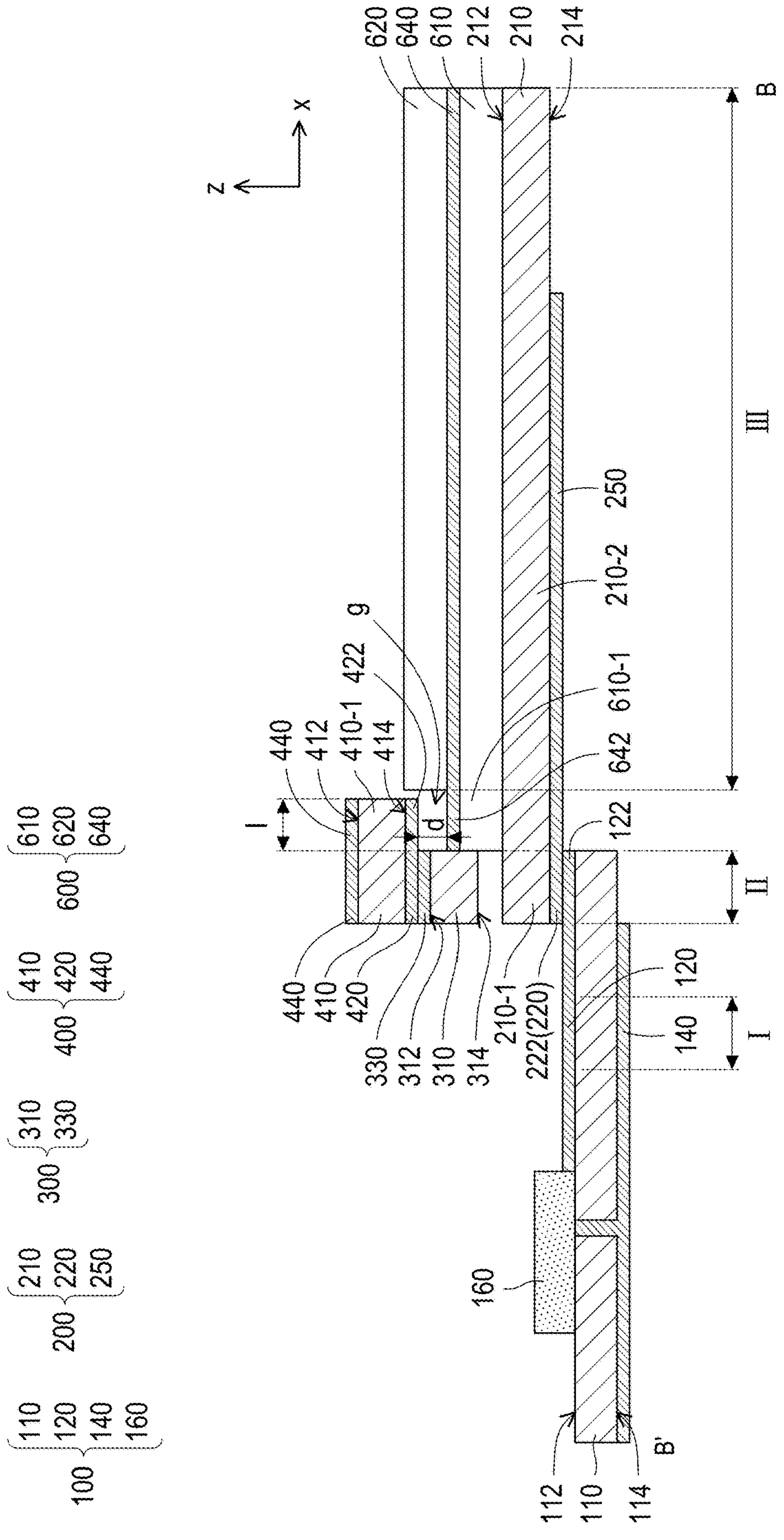
FIG. 3 is a cross-sectional view illustrating an antenna apparatus according to an embodiment of the disclosure.
Figure 4:
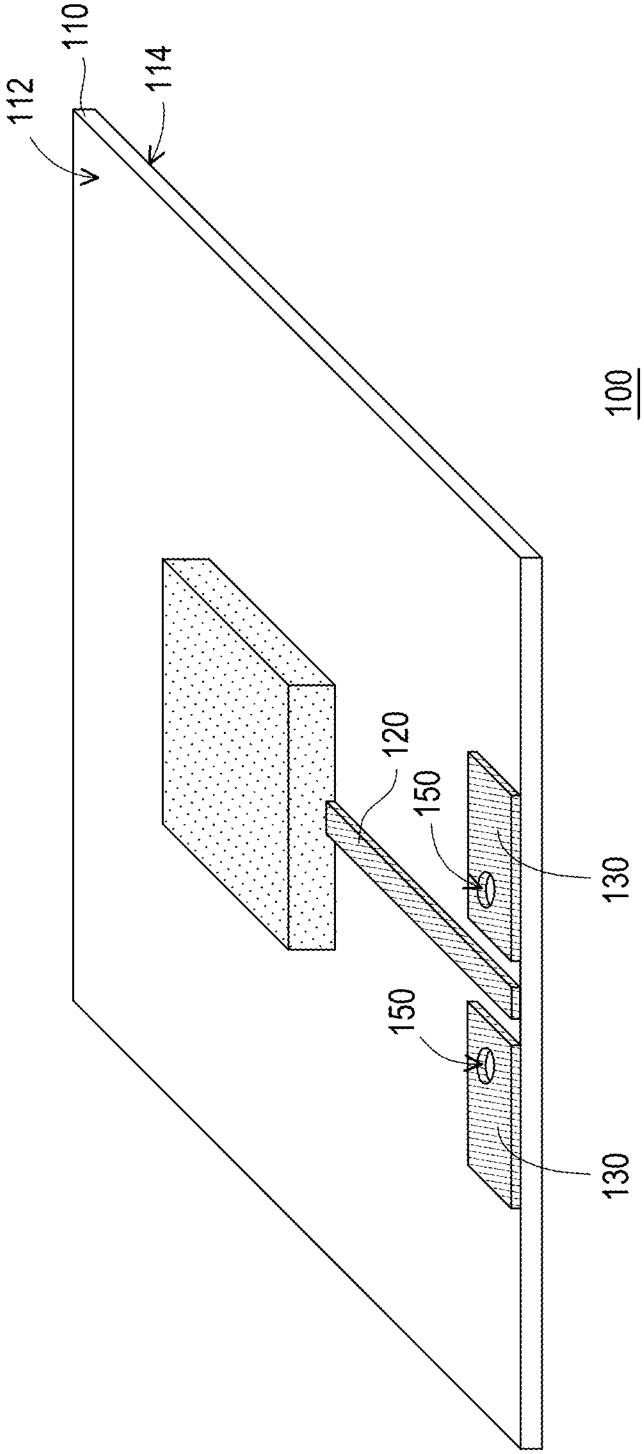
FIG. 4 is a top view and perspective view illustrating a signal source substrate of an antenna apparatus according to an embodiment of the disclosure.

FIG. 1 is an exploded perspective view illustrating an antenna apparatus according to an embodiment of the disclosure. FIG. 2 is a cross-sectional view illustrating an antenna apparatus according to an embodiment of the disclosure. FIG. 2 corresponds to a line segment A-A' in FIG. 1. FIG. 3 is a cross-sectional view illustrating an antenna apparatus according to an embodiment of the disclosure. FIG. 3 corresponds to a line segment B-B' in FIG. 1. FIG. 4 is a top view and perspective view illustrating a signal source substrate of an antenna apparatus according to an embodiment of the disclosure. Ground electrodes 140 shown in FIG. 2 and FIG. 3 are omitted in FIG. 4.

Please refer to FIG. 1, FIG. 2, FIG. 3, and FIG. 4. An antenna apparatus 10 includes a signal source substrate 100. The signal source substrate 100 includes a first base 110, a signal source line 120, and a first ground electrode 130. The first base 110 has an upper surface 112 and a lower surface 114 opposite to each other. The signal source line 120 is disposed on the upper surface 112 of the first base 110. The first ground electrode 130 is disposed on the upper surface 112 of the first base 110 and is structurally separated from the signal source line 120. In some embodiments, the signal source substrate 100 may further include a first conductive via 150 disposed in the first base 110 and is electrically connected to the first ground electrode 130. In some embodiments, the signal source substrate 100 may further include a ground electrode 140 disposed on the lower surface 114 of the first base 110, where the first conductive via 150 is electrically connected to the ground electrode 140 and the first ground electrode 130. In some embodiments, the signal source substrate 100 may include, for example, a double-layer printed circuit board. In some embodiments, the signal source substrate 100 may further include a signal source 160 disposed on the first base 110 and electrically connected to the signal source line 120. In some embodiments, the signal source 160 may include, for example, a microwave monolithic integrated circuit (MMIC).

Figure 5:
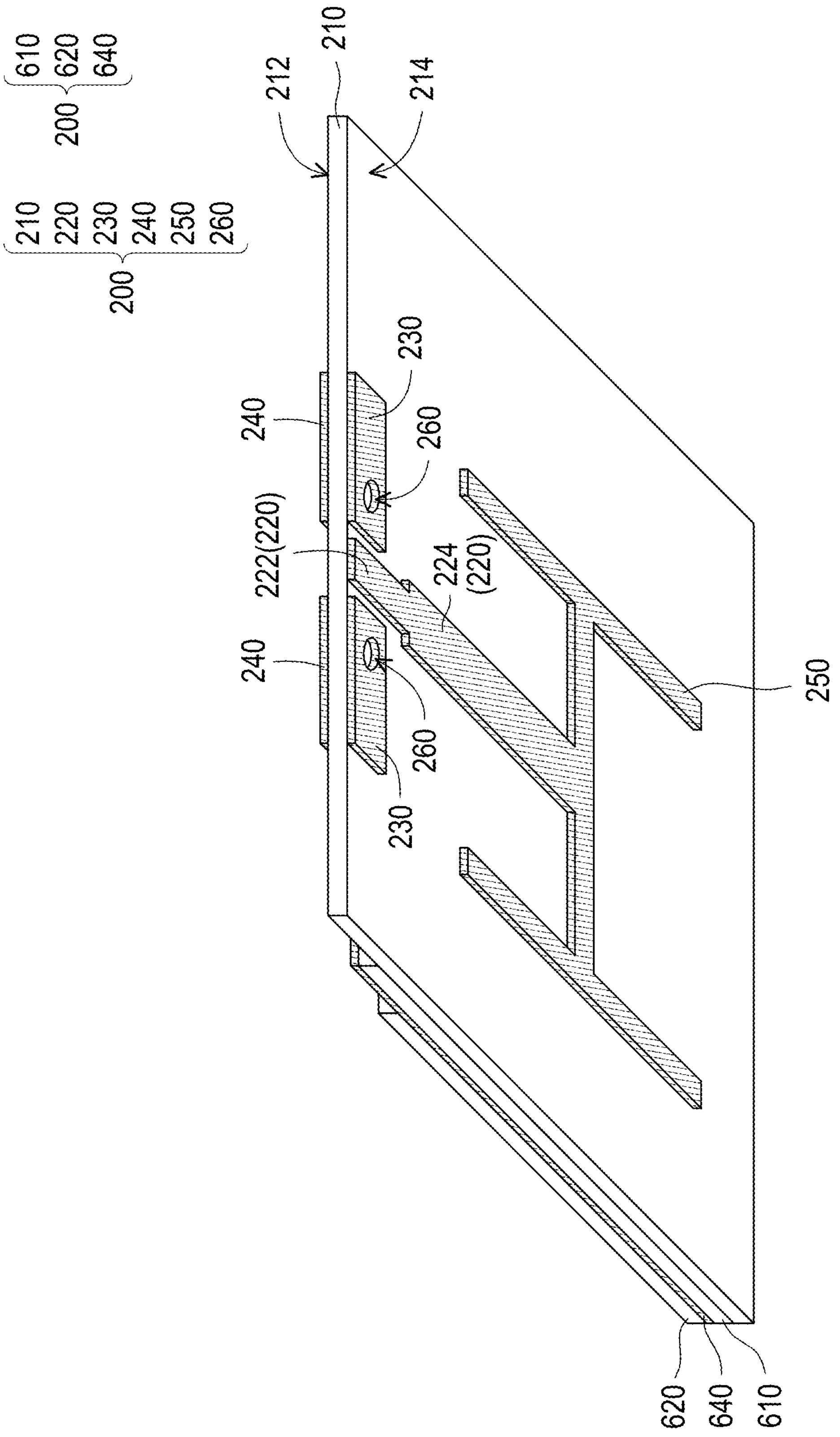
FIG. 5 is a bottom view and perspective view illustrating a feeding substrate and a modulation structure of an antenna apparatus according to an embodiment of the disclosure.
Figure 6:
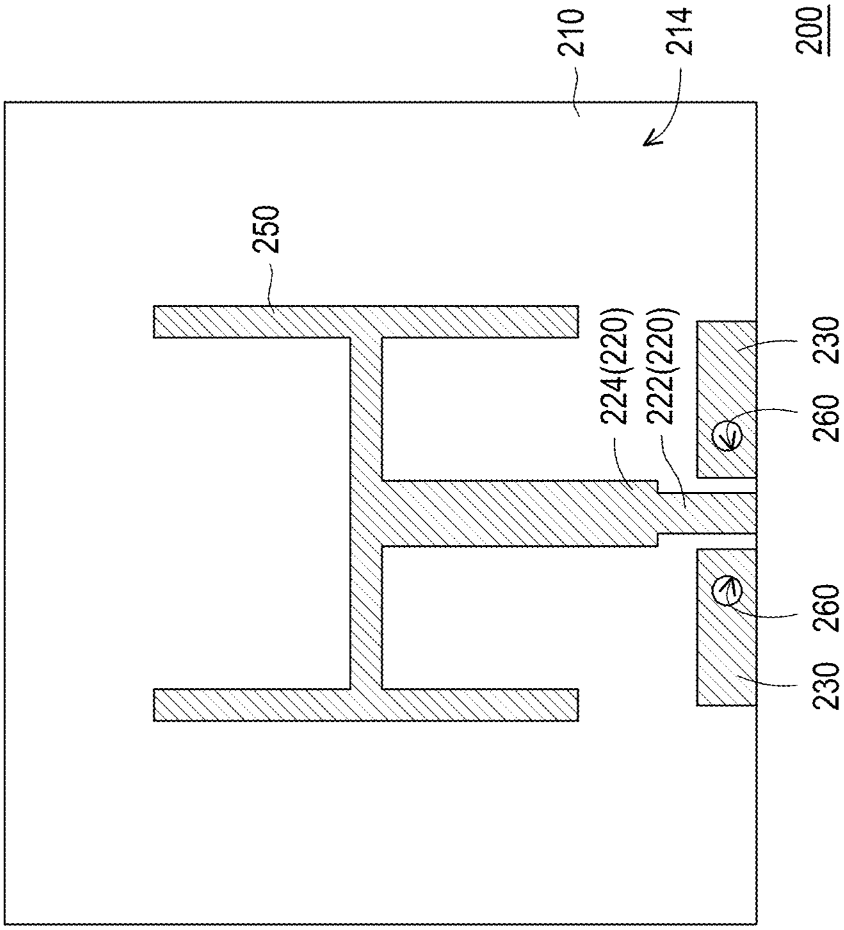
FIG. 6 is a bottom view illustrating a feeding substrate of an antenna apparatus according to an embodiment of the disclosure.
Figure 7:
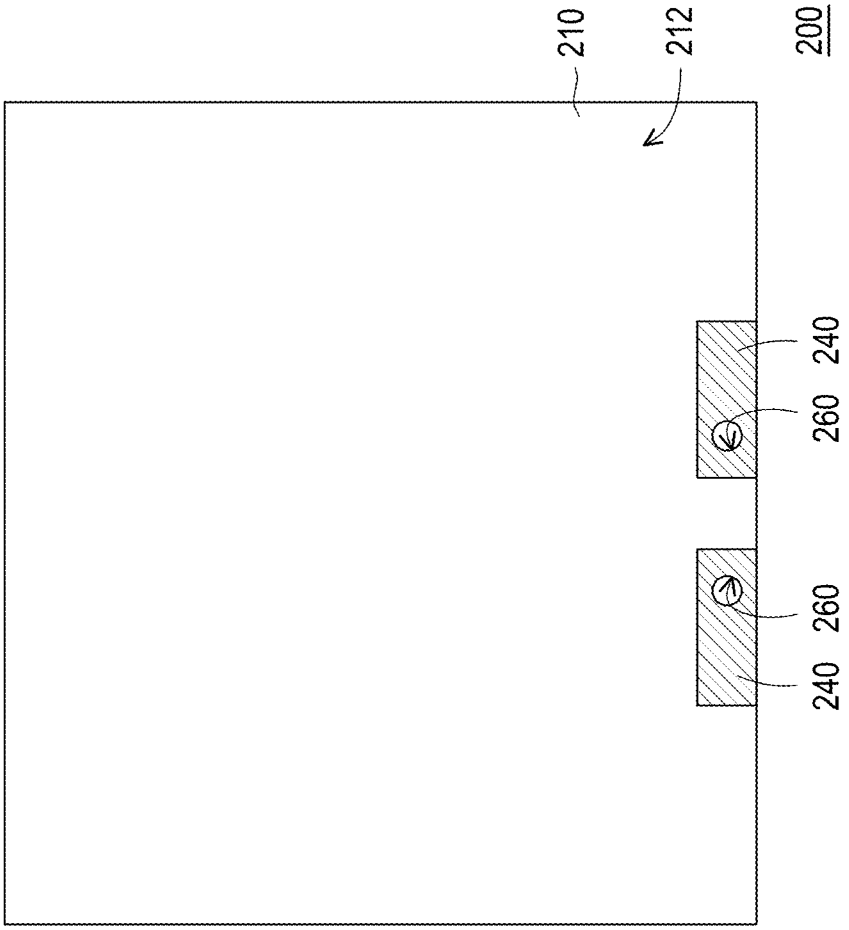
FIG. 7 is a top view illustrating a feeding substrate of an antenna apparatus according to an embodiment of the disclosure.

FIG. 5 is a bottom view and perspective view illustrating a feeding substrate and a modulation structure of an antenna apparatus according to an embodiment of the disclosure. FIG. 6 is a bottom view illustrating a feeding substrate of an antenna apparatus according to an embodiment of the disclosure. FIG. 7 is a top view illustrating a feeding substrate of an antenna apparatus according to an embodiment of the disclosure.

Please refer to FIG. 1, FIG. 2, FIG. 3, FIG. 4, and FIG. 5. The antenna apparatus 10 further includes a feeding substrate 200 partially disposed on the signal source substrate 100. The feeding substrate 200 includes a second base 210. The second base 210 has an upper surface 212 and a lower surface 214 opposite to each other. The lower surface 214 of the second base 210 of the feeding substrate 200 faces the upper surface 112 of the first base 110 of the signal source substrate 100. The second base 210 of the feeding substrate 200 has a first portion 210-1 and a second portion 210-2 connected to each other. The first portion 210-1 of the second base 210 of the feeding substrate 200 is disposed on the signal source substrate 100. The second portion 210-2 of the second base 210 of the feeding substrate 200 is disposed outside an area of the signal source substrate 100.

Please refer to FIG. 1, FIG. 3, FIG. 5, and FIG. 6. The feeding substrate 200 further includes a feeding signal line 220 disposed on the lower surface 214 of the second base 210. Referring to FIG. 1, FIG. 3, FIG. 4, FIG. 5, and FIG. 6, a portion 222 of the feeding signal line 220 of the feeding substrate 200 is stacked on a portion 122 of the signal source line 120 of the signal source substrate 100. The portion 222 of the feeding signal line 220 and the portion 122 of the signal source line 120 are face-to-face and adhered. In some embodiments, the portion 222 of the feeding signal line 220 may be abutting and in contact with the portion 122 of the signal source line 120 of the signal source substrate 100. In some embodiments, the feeding substrate 200 may further include a radiating conductive pattern 250 disposed on the lower surface 214 of the second portion 210-2 of the second base 210 and electrically connected to the feeding signal line 220.

Please refer to FIG. 1, FIG. 2, FIG. 5, and FIG. 6. The feeding substrate 200 further includes a second ground electrode 230 disposed on the lower surface 214 of the second base 210 and structurally separated from the feeding signal line 220. The second ground electrode 230 of the feeding substrate 200 is stacked on the first ground electrode 130 of the signal source substrate 100. The second ground electrode 230 of the feeding substrate 200 and the first ground electrode 130 of the signal source substrate 100 are face-to-face and adhered. In some embodiments, the second ground electrode 230 of the feeding substrate 200 may be abutting and in contact with the first ground electrode 130 of the signal source substrate 100.

Please refer to FIG. 1, FIG. 2, FIG. 5, FIG. 6, and FIG. 7. The feeding substrate 200 further includes a third ground electrode 240 disposed on the upper surface 212 of the second base 210 and electrically connected to the second ground electrode 230. In some embodiments, the feeding substrate 200 further includes a second conductive via 260 disposed in the second base 210 and electrically connected to the second ground electrode 230 and the third ground electrode 240. In some embodiments, the feeding substrate 200 may include, for example, a double-layer printed circuit board, but the disclosure is not limited to thereto.

Figure 8:
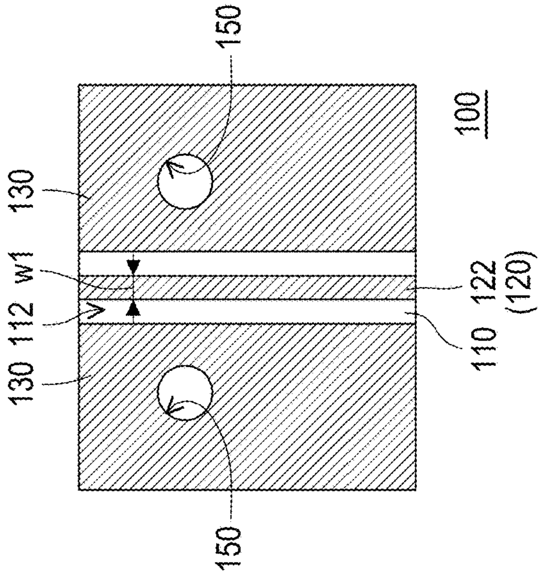
FIG. 8 is a partial top view and enlarged view illustrating a signal source substrate of an antenna apparatus according to an embodiment of the disclosure.
Figure 9:
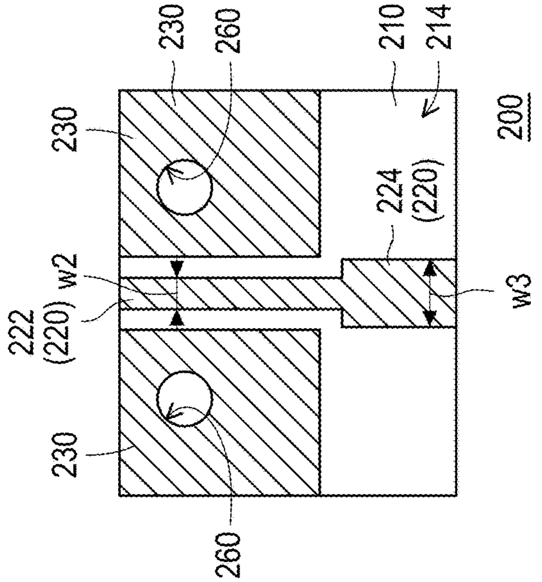
FIG. 9 is a partial bottom view and enlarged view illustrating a feeding substrate of an antenna apparatus according to an embodiment of the disclosure.
Figure 10:
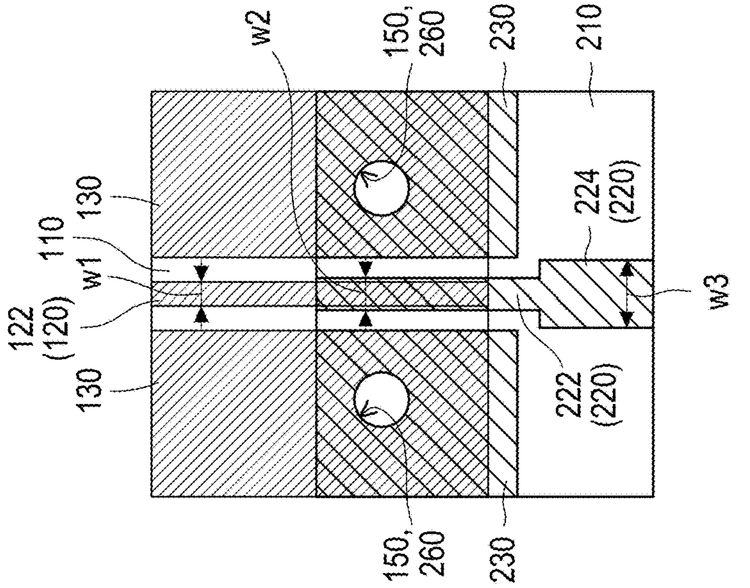
FIG. 10 is a partial top view and transparent enlarged view illustrating an antenna apparatus according to an embodiment of the disclosure.

FIG. 8 is a partial top view and enlarged view illustrating a signal source substrate of an antenna apparatus according to an embodiment of the disclosure. FIG. 9 is a partial bottom view and enlarged view illustrating a feeding substrate of an antenna apparatus according to an embodiment of the disclosure. FIG. 10 is a partial top view and transparent enlarged view illustrating an antenna apparatus according to an embodiment of the disclosure. FIG. 10 is an overlay of FIG. 8 and FIG. 9.

Please refer to FIG. 1, FIG. 3, FIG. 4, FIG. 5, FIG. 8, FIG. 9, and FIG. 10. In some embodiments, a line width w2 of the portion 222 of the feeding signal line 220 is greater than a line width w1 of the portion 122 of the signal source line 120. Thereby, when the feeding signal line 220 of the feeding substrate 200 and the signal source line 120 of the signal source substrate 100 are assembled in a face-to-face manner, impedance is based on the portion 222 of the feeding signal line 220 with the wider line width w2, which may effectively reduce impedance mismatch caused by assembly and/or cutting errors of the feeding substrate 200 and the signal source substrate 100, and reduce energy reflection. In some embodiments, the portion 222 of the feeding signal line 220 is disposed on the first portion 210-1 of the second base 210, another portion 224 of the feeding signal line 220 is disposed on the second portion 210-2 of the second base 210, the portion 222 of the feeding signal line 220 is connected to the other portion 224 of the feeding signal line 220, and a line width w3 of the other portion 224 of the feeding signal line 220 is greater than the line width w2 of the portion 222 of the feeding signal line 220.

Figure 11:
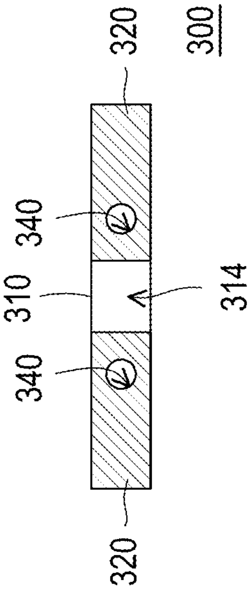
FIG. 11 is a bottom view illustrating an intermediate substrate of an antenna apparatus according to an embodiment of the disclosure.
Figure 12:
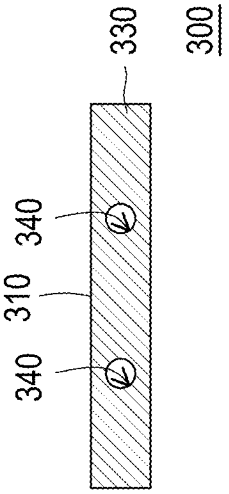
FIG. 12 is a top view illustrating an intermediate substrate of an antenna apparatus according to an embodiment of the disclosure.

FIG. 11 is a bottom view illustrating an intermediate substrate of an antenna apparatus according to an embodiment of the disclosure. FIG. 12 is a top view illustrating an intermediate substrate of an antenna apparatus according to an embodiment of the disclosure. Please refer to FIG. 1, FIG. 2, FIG. 3, FIG. 11, and FIG. 12. The antenna apparatus 10 further includes an intermediate substrate 300 disposed on the first portion 210-1 of the feeding substrate 200. The intermediate substrate 300 includes a third base 310. The third base 310 has an upper surface 312 and a lower surface 314 opposite to each other. The lower surface 314 of the third base 310 faces the upper surface 212 of the second base 210 of the feeding substrate 200. The intermediate substrate 300 further includes a fourth ground electrode 320 disposed on the lower surface 314 of the third base 310. The fourth ground electrode 320 of the intermediate substrate 300 is stacked on the third ground electrode 240 of the feeding substrate 200. The fourth ground electrode 320 of the intermediate substrate 300 and the third ground electrode 240 of the feeding substrate 200 are face-to-face and adhered. In some embodiments, the fourth ground electrode 320 of the intermediate substrate 300 may be abutting and in contact with the third ground electrode 240 of the feeding substrate 200. The intermediate substrate 300 further includes a fifth ground electrode 330 disposed on the upper surface 312 of the third base 310 and electrically connected to the fourth ground electrode 320. In some embodiments, the intermediate substrate 300 further includes a third conductive via 340 disposed in the third base 310 and electrically connected to the fourth ground electrode 320 and the fifth ground electrode 330.

Figure 13:
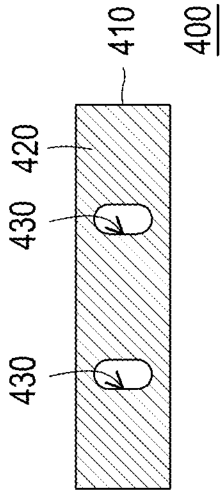
FIG. 13 is a bottom view illustrating a bridge substrate of an antenna apparatus according to an embodiment of the disclosure.
Figure 14:
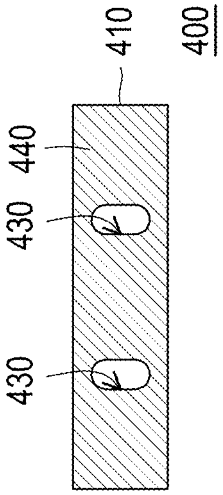
FIG. 14 is a top view illustrating a bridge substrate of an antenna apparatus according to an embodiment of the disclosure.

FIG. 13 is a bottom view illustrating a bridge substrate of an antenna apparatus according to an embodiment of the disclosure. FIG. 14 is a top view illustrating a bridge substrate of an antenna apparatus according to an embodiment of the disclosure. Please refer to FIG. 1, FIG. 2, FIG. 3, FIG. 13, and FIG. 14. The antenna apparatus 10 further includes a bridge substrate 400 disposed on the intermediate substrate 300. The bridge substrate 400 includes a fourth base 410 having an upper surface 412 and a lower surface 414 opposite to each other. The lower surface 414 of the fourth base 410 faces the upper surface 312 of the third base 310 of the intermediate substrate 300. The bridge substrate 400 further includes a sixth ground electrode 420 disposed on the lower surface 414 of the fourth base 410. The sixth ground electrode 420 of the bridge substrate 400 is stacked on the fifth ground electrode 330 of the intermediate substrate 300. The sixth ground electrode 420 of the bridge substrate 400 and the fifth ground electrode 330 of the intermediate substrate 300 are face-to-face and adhered. In some embodiments, the sixth ground electrode 420 of the bridge substrate 400 may be abutting and in contact with the fifth ground electrode 330 of the intermediate substrate 300.

The fourth base 410 of the bridge substrate 400 has an extension portion 410-1 extending beyond an area of the intermediate substrate 300, and the sixth ground electrode 420 has an extension portion 422. The extension portion 422 of the sixth ground electrode 420 is disposed on the extension portion 410-1 of the fourth base 410. The extension portion 422 of the sixth ground electrode 420 extends beyond the area of the intermediate substrate 300 and faces the feeding substrate 200.

In some embodiments, the bridge substrate 400 may further include a fourth conductive via 430 disposed in the fourth base 410 and electrically connected to the sixth ground electrode 420. In some embodiments, the bridge substrate 400 may optionally include a ground electrode 440 disposed on the upper surface 412 of the fourth base 410, where the fourth conductive via 430 is electrically connected to the ground electrode 440 and the sixth ground electrode 420.

Please refer to FIG. 1 and FIG. 2. The antenna apparatus 10 further includes a jointing element 500 joining the bridge substrate 400, the intermediate substrate 300, the feeding substrate 200, and the signal source substrate 100. The jointing element 500 is configured to securely stack the bridge substrate 400, the intermediate substrate 300, the feeding substrate 200, and the signal source substrate 100 together. In some embodiments, the jointing element 500 may be electrically connected to the sixth ground electrode 420 of the bridge substrate 400, the fifth ground electrode 330 and the fourth ground electrode 320 of the intermediate substrate 300, the third ground electrode 240 and the second ground electrode 230 of the feeding substrate 200, and the first ground electrode 130 of the signal source substrate 100. For example, in some embodiments, the jointing element 500 includes a first component 510 disposed in the first conductive via 150 of the signal source substrate 100, the second conductive via 260 of the feeding substrate 200, the third conductive via 340 of the intermediate substrate 300, and the fourth conductive via 430 of the bridge substrate 400. In some embodiments, the jointing element 500 further includes a second component 520, the signal source substrate 100, the feeding substrate 200, the intermediate substrate 300, and the bridge substrate 400 disposed between a portion of the first component 510 of the jointing element 500 and the second component 520. The first component 510 and the second component 520 cooperate to securely stack the bridge substrate 400, the intermediate substrate 300, the feeding substrate 200, and the signal source substrate 100 together. For example, in an embodiment, the first component 510 and the second component 520 may be a screw and a nut respectively. The screw and the nut are configured to screw together to securely stack the bridge substrate 400, the intermediate substrate 300, the feeding substrate 200, and the signal source substrate 100 together. However, the disclosure is not limited to thereto. In other embodiments, the jointing element 500 may also be other types of jointing elements.

Figure 15:
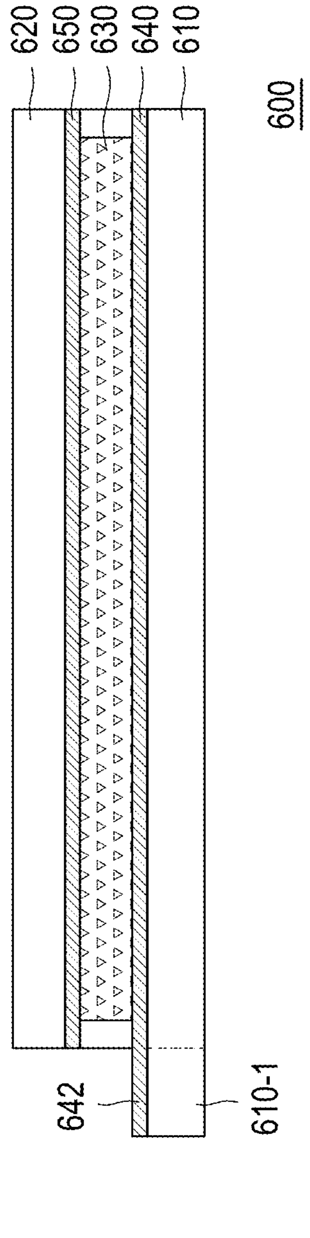
FIG. 15 is a cross-sectional view illustrating a modulation structure of an antenna apparatus according to an embodiment of the disclosure.

FIG. 15 is a cross-sectional view illustrating a modulation structure of an antenna apparatus according to an embodiment of the disclosure. A liquid crystal layer 630 and a modulation electrode 650 in FIG. 15 are omitted in FIG. 1, FIG. 2, FIG. 3, and FIG. 5.

Please refer to FIG. 1, FIG. 2, FIG. 3, and FIG. 15. The antenna apparatus 10 further includes a modulation structure 600 disposed on the second portion 210-2 of the feeding substrate 200. The modulation structure 600 includes a fifth base 610, a sixth base 620, a liquid crystal layer 630, and a seventh ground electrode 640. In some embodiments, a material of the fifth base 610 and the sixth base 620 of the modulation structure 600 is different from a material of the fourth base 410 of the bridge substrate 400. In some embodiments, the material of the fifth base 610 and the sixth base 620 of the modulation structure 600 may include glass, but the disclosure is not limited thereto. The fifth base 610 is located between the sixth base 620 and the feeding substrate 200. The liquid crystal layer 630 is disposed between the fifth base 610 and the sixth base 620. The seventh ground electrode 640 is disposed on the fifth base 610 and is located between the liquid crystal layer 630 and the fifth base 610. In some embodiments, the modulation structure 600 further includes a modulation electrode 650 disposed on the sixth base 620 and located between the sixth base 620 and the liquid crystal layer 630. The fifth base 610 has an extension portion 610-1 extending beyond an area of the sixth base 620. The seventh ground electrode 640 has an extension portion 642. The extension portion 642 of the seventh ground electrode 640 is disposed on the extension portion 610-1 of the fifth base 610 and extends beyond the area of the sixth base 620. The extension portion 422 of the sixth ground electrode 420 of the bridge substrate 400 is disposed on the extension portion 642 of the seventh ground electrode 640 of the modulation structure 600.

In some embodiments, an air gap g exists between the extension portion 422 of the sixth ground electrode 420 of the bridge substrate 400 and the extension portion 642 of the seventh ground electrode 640 of the modulation structure 600. In some embodiments, the extension portion 422 of the sixth ground electrode 420 of the bridge substrate 400 and the extension portion 642 of the seventh ground electrode 640 of the modulation structure 600 have a distance d in a direction z perpendicular to the fourth base 410 of the bridge substrate 400, and the distance d may fall within a range of 0.001 mm to 1 mm. However, the disclosure is not limited thereto. In other implementations, the extension portion 422 of the sixth ground electrode 420 of the bridge substrate 400 and the extension portion 642 of the seventh ground electrode 640 of the modulation structure 600 may also be in contact. In some embodiments, the extension portion 422 of the sixth ground electrode 420 of the bridge substrate 400 has a length l in a direction x parallel to the third base 310 of the intermediate substrate 300, and the length l may fall within a range of 1 mm to 1.5 mm.

Please refer to FIG. 1, FIG. 2, and FIG. 3. A portion of the signal source line 120 away from the first ground electrode 130 and a portion of the ground electrode 140 are located in an area I. The portion 122 of the signal source line 120 of the signal source substrate 100, the first ground electrode 130 of the signal source substrate 100, the first portion 210-1 of the feeding substrate 200, the intermediate substrate 300, and the sixth ground electrode 420 of the bridge substrate 400 are located in an area II. The radiating conductive pattern 250 of the feeding substrate 200 and the seventh ground electrode 640 of the modulation structure 600 are located in an area III.

Please refer to FIG. 1, FIG. 2, and FIG. 3. An effect of irregular cutting in a thickness direction (that is, the direction z) may be achieved by using the signal source substrate 100, the feeding substrate 200, the intermediate substrate 300, and the bridge substrate 400 stacked on each other. The signal source substrate 100, the feeding substrate 200, the intermediate substrate 300, and the bridge substrate 400 stacked on each other are assembled together in a face-to-face manner to transmit high-frequency electromagnetic wave signals. Specifically, the electromagnetic wave signal is transmitted in a microstrip manner in the area I and is transmitted in a co-plane waveguide with ground (CPWG) manner in the area II, thereby transmitting the signal from the first ground electrode 130 of the signal source substrate 100 to the seventh ground electrode 640 of the modulation structure 600. In the area III, the electromagnetic wave signal is transmitted in a microstrip manner.

It is worth noting that the bridge substrate 400 does not need to fasten the seventh ground electrode 640 of the modulation structure 600 by solder to transmit the electromagnetic wave signal to the seventh ground electrode 640 of the modulation structure 600. Therefore, there is no problem of soldering the bridge substrate 400 to the modulation structure 600. Moreover, if the modulation structure 600 is damaged, the damaged modulation structure 600 may be easily removed from the second portion 210-2 of the feeding substrate 200 and replaced with a new modulation structure 600, while the normal feeding substrate 200, bridge substrate 400, intermediate substrate 300, and signal source substrate 100 are continued to be used. In other words, the antenna apparatus 10 is easy to maintain and has low maintenance costs.

In some embodiments, the first component 510 of the jointing element 500 may be electrically connected to the first ground electrode 130 of the signal source substrate 100 with the sixth ground electrode 420 of the bridge substrate 400, avoiding the generation of other modes that affect transmission efficiency during high-frequency transmission.

In some embodiments, the air gap g between the extension portion 422 of the sixth ground electrode 420 of the bridge substrate 400 and the extension portion 642 of the seventh ground electrode 640 of the modulation structure 600 may achieve a DC block effect, blocking the passage of low-frequency signals driving the modulation structure 600, and thereby reducing the interference of low-frequency signals driving the modulation structure 600.

What is claimed is:

1. An antenna apparatus, comprising:

a signal source substrate, comprising:

a first base, having an upper surface;

a signal source line, disposed on the upper surface of the first base; and a first ground electrode, disposed on the upper surface of the first base, and structurally separated from the signal source line;

a feeding substrate, partially disposed on the signal source substrate, wherein the feeding substrate comprises:

a second base, having an upper surface and a lower surface opposite to each other, wherein the lower surface of the second base of the feeding substrate faces the upper surface of the first base of the signal source substrate, the second base has a first portion and a second portion connected to each other, the first portion of the second base is disposed on the signal source substrate, and the second portion of the second base is disposed outside an area of the signal source substrate;

a feeding signal line, disposed on the lower surface of the second base, wherein a portion of the feeding signal line of the feeding substrate is stacked on a portion of the signal source line of the signal source substrate;

a second ground electrode, disposed on the lower surface of the second base, and structurally separated from the feeding signal line, wherein the second ground electrode of the feeding substrate is stacked on the first ground electrode of the signal source substrate; and a third ground electrode, disposed on the upper surface of the second base, and electrically connected to the second ground electrode;

an intermediate substrate, disposed on the first portion of the feeding substrate, and comprising:

a third base, having an upper surface and a lower surface opposite to each other, wherein the lower surface of the third base faces the upper surface of the second base of the feeding substrate;

a fourth ground electrode, disposed on the lower surface of the third base, wherein the fourth ground electrode of the intermediate substrate is stacked on the third ground electrode of the feeding substrate; and a fifth ground electrode, disposed on the upper surface of the third base, and electrically connected to the fourth ground electrode;

a bridge substrate, disposed on the intermediate substrate, wherein the bridge substrate comprises:

a fourth base, having a lower surface, wherein the lower surface of the fourth base faces the upper surface of the third base of the intermediate substrate; and a sixth ground electrode, disposed on the lower surface of the fourth base, wherein the sixth ground electrode of the bridge substrate is stacked on the fifth ground electrode of the intermediate substrate, the fourth base of the bridge substrate has an extension portion extending beyond an area of the intermediate substrate, the sixth ground electrode has an extension portion, and the extension portion of the sixth ground electrode is disposed on the extension portion of the fourth base;

a jointing element, joining the bridge substrate, the intermediate substrate, the feeding substrate, and the signal source substrate; and a modulation structure, disposed on the second portion of the feeding substrate, wherein the modulation structure comprises:

a fifth base;

a sixth base, wherein the fifth base is located between the sixth base and the feeding substrate;

a liquid crystal layer, disposed between the fifth base and the sixth base; and a seventh ground electrode, disposed on the fifth base, and located between the liquid crystal layer and the fifth base, wherein the fifth base has an extension portion extending beyond an area of the sixth base, the seventh ground electrode has an extension portion, the extension portion of the seventh ground electrode is disposed on the extension portion of the fifth base, and the extension portion of the sixth ground electrode of the bridge substrate is disposed on the extension portion of the seventh ground electrode of the modulation structure.

2. The antenna apparatus according to claim 1, wherein the signal source substrate further comprises a first conductive via, the first conductive via of the signal source substrate is disposed in the first base of the signal source substrate and electrically connected to the first ground electrode of the signal source substrate, the feeding substrate further comprises a second conductive via, the second conductive via of the feeding substrate is disposed in the second base of the feeding substrate and electrically connected to the second ground electrode and the third ground electrode of the feeding substrate, the intermediate substrate further comprises a third conductive via, the third conductive via of the intermediate substrate is disposed in the third base of the intermediate substrate and electrically connected to the fourth ground electrode and the fifth ground electrode of the intermediate substrate, the bridge substrate further comprises a fourth conductive via, the fourth conductive via of the bridge substrate is disposed in the fourth base of the bridge substrate and electrically connected to the sixth ground electrode of the bridge substrate, and the jointing element comprises a first component disposed in the first conductive via of the signal source substrate, the second conductive via of the feeding substrate, the third conductive via of the intermediate substrate, and the fourth conductive via of the bridge substrate.

3. The antenna apparatus according to claim 1, wherein an air gap exists between the extension portion of the sixth ground electrode of the bridge substrate and the extension portion of the seventh ground electrode of the modulation structure.

4. The antenna apparatus according to claim 1, wherein the extension portion of the sixth ground electrode of the bridge substrate and the extension portion of the seventh ground electrode of the modulation structure have a distance in a direction perpendicular to the fourth base of the bridge substrate, and the distance falls within a range of 0.001 mm to 1 mm.

5. The antenna apparatus according to claim 1, wherein the extension portion of the sixth ground electrode of the bridge substrate has a length in a direction parallel to the third base of the intermediate substrate, and the length falls within a range of 1 mm to 1.5 mm.

6. The antenna apparatus according to claim 1, wherein a line width of the portion of the feeding signal line is greater than a line width of the portion of the signal source line.

7. The antenna apparatus according to claim 1, wherein the portion of the feeding signal line is disposed on the first portion of the second base, another portion of the feeding signal line is disposed on the second portion of the second base, the portion of the feeding signal line is connected to the another portion of the feeding signal line, and a line width of the another portion of the feeding signal line is greater than a line width of the portion of the feeding signal line.

* * * * *